United States Patent
Elnozahy

(10) Patent No.: US 6,233,674 B1
(45) Date of Patent: May 15, 2001

(54) METHOD AND SYSTEM FOR SCOPE-BASED COMPRESSION OF REGISTER AND LITERAL ENCODING IN A REDUCED INSTRUCTION SET COMPUTER (RISC)

(75) Inventor: Elmootazbellah Elnozahy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,258

(22) Filed: Jan. 29, 1999

(51) Int. Cl.$^7$ .................................................. G06F 9/30
(52) U.S. Cl. ............................................. 712/227; 712/209
(58) Field of Search .................................... 712/227, 210, 712/209

(56) References Cited

PUBLICATIONS

Kirovski, Darko et al., *Procedure Based Program Compression*, IEEE, 1997, pp. 204–213.*
Araujo, Guido et al., *Code Compression Based on Operand Factorization*, IEEE, 1998, pp. 194–201.*
Okuma, T. et al., *Instruction Encoding Techniques for Area Minimization of Instruction ROM*, IEEE, 1998, pp. 125–130.*
Lefurgy, Charles et al., *Improving Code Density Using Compression Techniques*, IEEE, 1997, pp. 194–203.*
Tong Lai Yu, "Data Compression for PC Software Distribution," Software–Practice and Experience, vol. 26(11), pp. 1181–1195, Nov. 1996.
Christopher Fraser et al., "Custom Instruction Sets for Code Compression," p. 9, Oct. 19, 1995.
Michael Franz et al., "Slim Binaries," Department of Information and Computer Science, University of California at Irvine, pp. 1–16.
Jens Ernst et al., "Code Compression," pp. 358–365.

* cited by examiner

*Primary Examiner*—Richard L. Ellis
(74) *Attorney, Agent, or Firm*—Casimer K. Salys; Felsman, Bradley, Vaden, Gunter & Dillon, LLP

(57) ABSTRACT

A compression scheme for program executables that run in a reduced instruction set computer (RISC) architecture such as the PowerPC is disclosed. The method and system utilize scope-based compression for increasing the effectiveness of conventional compression with respect to register and literal encoding. First, discernible patterns are determined by exploiting instruction semantics and conventions that compilers adopt in register and literal usage. Additional conventions may also be set for register usage to facilitate compression. Using this information, separate scopes are created such that in each scope there is a more prevalent usage of a limited set of registers or literal value ranges, or there is an easily discernible pattern of register or literal usage. Each scope then is compressed separately by a conventional compressor. The resulting code is more compact because the small number of registers and literals in each scope makes the encoding sparser than when the compressor operates on the global scope that includes all instructions in a program. Additionally, scope-based compression reveals more frequent patterns within each scope than when considering the entire instruction stream as an opaque stream of bits.

27 Claims, 2 Drawing Sheets

METHOD AND SYSTEM FOR SCOPE-BASED COMPRESSION OF REGISTER AND LITERAL ENCODING IN A REDUCED INSTRUCTION SET COMPUTER (RISC)

This application relates to co-pending applications, entitled "METHOD AND SYSTEM FOR COMPRESSING REDUCED INSTRUCTION SET COMPUTER (RISC) EXECUTABLE CODE THROUGH INSTRUCTION SET EXPANSION" U.S. Ser. No. 09/239,260, filed Jan. 29, 1999, "METHOD AND SYSTEM FOR CLUSTERING INSTRUCTIONS WITHIN AN EXECUTABLE CODE FOR COMPRESSION" U.S. Ser. No. 09/239,261, filed Jan. 29, 1999, and "METHOD AND SYSTEM FOR COMPRESSING REDUCED INSTRUCTION SET COMPUTER (RISC) EXECUTABLE CODE" U.S. Ser. No. 09/239,259, filed Jan. 29, 1999, all filed of even date herewith and assigned to the assignee herein named, the subject matter of each of which is incorporated herein by reference.

BACKGROUND OF THE INVENTION

1. Technical Field

The present invention relates to a method and system for compressing data in general and in particular to a method and system for compressing executable code. Still more particularly, the present invention relates to a method and system for compressing executable code in the context of a Reduced Instruction Set Computer (RISC) architecture.

2. Description of the Prior Art

Reduced Instruction Set Computer (RISC) architectures simplify hardware implementation and compiler design by making all instructions have the same size and follow a few simple formats. A price to pay for these advantages is the large size of executable code written in these instruction sets. The large code size reduces instruction cache effectiveness on modern processors and utilization of memory resources. It also increases program-loading time when code is shipped over in a network environment or retrieved from a slow mechanical device like a disk.

Currently, network computers, embedded controllers, set-top boxes, hand held devices and the like receive executables over a network or possibly through slow phone links or communication channels. Furthermore, these devices may have very limited memory capacity and when their memory is constrained, large programs may not fit in the available memory to run on the device. Therefore, for devices having RISC processors to be competitive in their segment of the market place, they may require highly efficient code compression that mitigates the disadvantage of large executable sizes. Traditionally, however, it has been difficult to compress executable code for RISC processors.

The difficulty in compressing executable code for RISC processors is partly due to the relatively high frequency of using registers in instruction encoding. A typical RISC architecture such as the International Business Machines' PowerPC processor implements 32 integer and 32 floating point registers. The instruction set encodes these registers using 5-bit codes to express a register number from 0 to 31. This encoding poses problems when compressing an executable for two reasons. First, the encoding is dense since all possible values for a register code are valid, resulting in high entropy encoding that is difficult to compress. Second, compilers for RISC processors use all registers. Therefore all possible register codes may appear uniformly throughout the code, making it difficult for a conventional compressor to find frequent patterns and produce effective compression.

The problem stated above is substantial because register fields occupy a large chunk of the instruction code, and because RISC instruction sets use registers as the primary data operands. An instruction may contain one, two or three register fields consuming between 5 to 15 bits of a 32-bit instruction code. In a typical program, register codes account for 20% to 40% of the total code size.

Compressing literals also poses a similar problem to that of compressing registers. Literals are data constants that appear in an instruction set. For example, literals may specify the values of branch addresses, pointer offsets, and constant data values. Literals complicate compression because they cover a wide range of integers. Combined, registers and literals contribute between 50% to 75% to the size of a typical executable code on a RISC processor.

Therefore there is a need for a method and system to increase the effectiveness of compressing register and literal encodings for RISC processor such as the PowerPC family. The present invention solves these problems in a novel and unique manner, which is not previously known in the art.

SUMMARY OF THE INVENTION

In view of the foregoing, it is therefore an object of the present invention to provide an improved method and system for compressing data.

It is another object of the present invention to provide an improved method and system for compressing executable code in the context of a Reduced Instruction Set Computer (RISC) architecture.

It is yet another object of the present invention to provide an improved method and system for compressing executable code in the context of a RISC architecture by creating separate scopes for register and literal encoding for enhancing conventional code compression.

In accordance with a method and system of the present invention, a compression scheme for program executables that run in a reduced instruction set computer (RISC) architecture such as the PowerPC is disclosed. The method and system use separate scopes for encoding registers and literals according to the semantics of the instructions. A conventional compressor then treats each scope separately to produce better encoding than if it were to consider the program code as an opaque stream of bits as is common in prior art.

In a one-time step, discernible usage patterns are determined by examining the semantics of instructions and conventions that compilers adopt in using registers and literals. The result of this step is an identification and specification of scopes that should be treated separately during compression. For example, load/store instructions often use the stack pointer as a base address with an offset for loading (storing) data from (into) memory into (from) registers. Thus, by creating a separate scope for the base register in the load/store instructions, the frequency of using the stack pointer within the scope is very high. A traditional compressor then can easily discerns the high pattern of using the stack pointer and produce much more efficient compression than if it were to consider the occurrences of the same register within the general instruction stream. Additional conventions may also be set for register usage to facilitate compression. The compiler could impose these conventions during code generation. For example, the compiler could try to associate certain registers with certain instructions, such that this association would render the encoding unnecessary for these registers. Additionally, such additional conventions could be enforced by a binary rewriting system should the original source of the executable be unavailable for recompilation.

Literals are treated similarly. For example, load/store offsets are found in our implementation to occur more frequently in the range of −64/+64 than in other ranges. By considering a separate scope for the literals that appear in load/store instructions, there is a higher frequency of occurrences of values within the aforementioned data range than if the same literals were to be treated anonymously within the instruction stream as in prior art. Similar treatment is possible for other types of literals.

Once the scopes have been identified and specified, a compressor is built to parse the instructions and indentify the registers and literals belonging to each scope. The compressor then applies different traditional compression algorithms to the different scopes. Since in each scope there is a more prevalent usage of a limited set of registers and/or literals, the traditional compression scheme will be far more effective in producing more compact code than if it were to consider the executable code as an opaque stream of bits.

All objects, features, and advantages of the present invention will become apparent in the following detailed description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
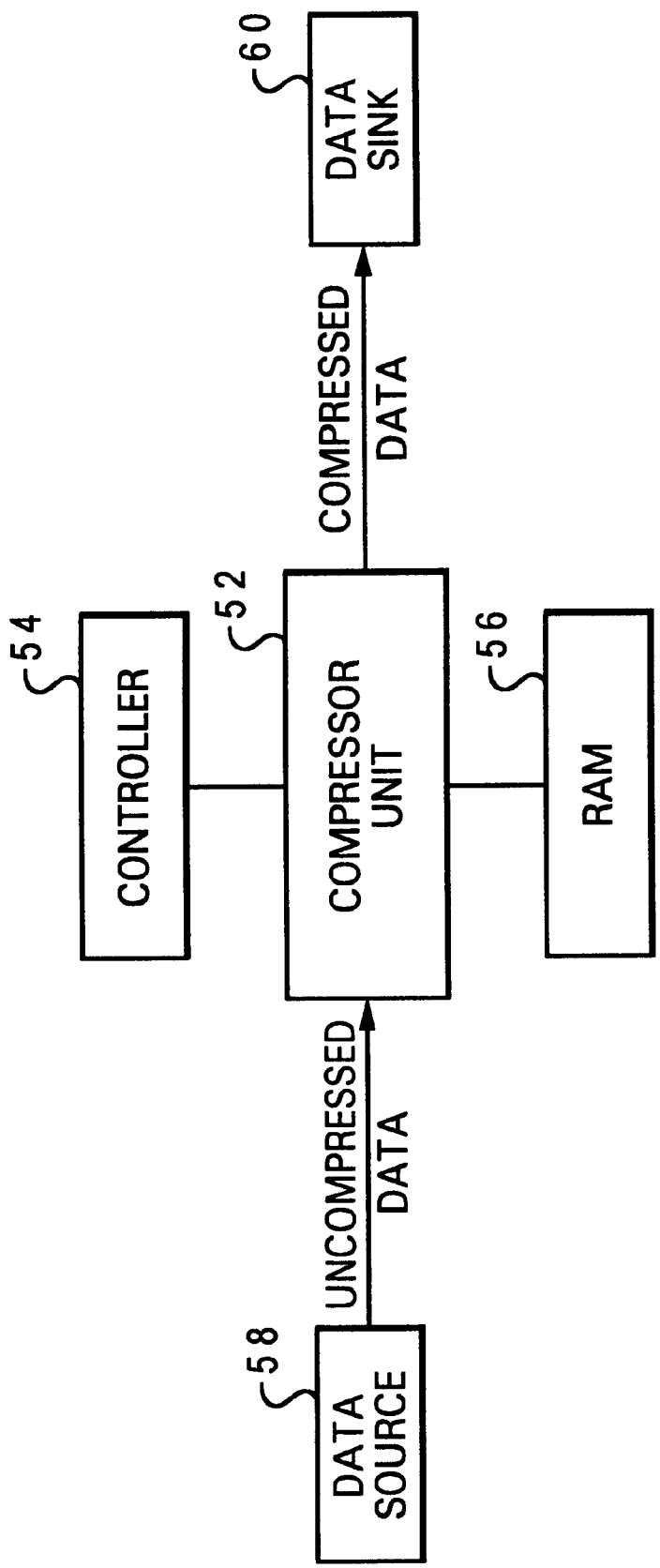
FIG. 1 is a block diagram of a compressor unit in which a preferred embodiment of the present invention may be incorporated.

Those skilled in the art appreciate that the invention described herein can be implemented in either hardware or software. With reference now to the figures and in particular with reference to FIG. 1, there is depicted a block diagram of a data compressor unit in which a preferred embodiment of the present invention may be incorporated. As shown, compressor unit 52 is coupled to a controller 54 and a random-access memory (RAM) 56. All data structures associated with the combination of the different compression algorithms are maintained within RAM 56. Controller 54 stores in non-volatile memory the specifications for the separate scopes to be used by the compressor unit 52. During operation, compressor unit 52 receives from a data source 58 an uncompressed executable program. After data encoding using the specifications for the separate scopes stored in controller 54 in accordance with the preferred embodiment of the present invention, a compressed executable program is then transmitted to a data sink 60. The data sink could be a storage device or a communication link.

Following is described, without loss of generality, an illustrated sample specification of separate scopes within the PowerPC instruction set that may be stored in controller 54. This subdivision is in accordance with the present invention and is provided here by way of example, but not of limitation. In the following description, we use the convention of numbering bits as defined in the PowerPC manual book, in which the most significant bit is numbered 0, while the least significant bit is numbered 31.

Scope 1: First register in load/store instructions, bits 11–15 from within each 32-bit load/store instruction.

Scope 2: Second, and optionally third register, in load/store instructions, bits 16–20, and possibly bits 21–25 from within each 32-bit load/store instruction.

Scope 3: First, second and possibly third registers, in fixed point arithmetic and logic instructions, bits 11–15, 16–20, and possibly 21–25 from within each 32-bit fixed point arithmetic and logic instruction.

Scope 4: First, second, and possibly third floating point registers in floating point arithmetic instructions, bit ranges 11–15, 16–20, and possibly 21–25 from within each 32-bit floating point arithmetic instruction.

Scope 5: All registers in any instruction containing a register encoding that is not covered by scopes 1 through 4.

Scope 5: Load/store offset in load/store instructions, bit ranges 16–31 from within each 32-bit load/store instruction.

Scope 6: Branch offsets in one branch instruction with absolute targets, bits 6–29 from within the branch absolute instruction (only one in the PowerPC architecture).

Scope 7: Branch offsets in one branch instruction with relative address target, bits 6–29 from within the branch relative instruction (only one in the PowerPC architecture).

Scope 8: Branch offsets in conditional branch instructions with absolute targets, bits 16–29 from within each conditional branch 32-bit instruction with absolute addressing.

Scope 9: Branch offsets in conditional branch instructions with relative address targets, bits 16–29 from within each 32-bit conditional branch instruction with relative addressing.

Scope 10: Immediate constants in arithmetic and logic fixed point instructions, bits 16–31 from within each 32-bit arithmetic/logic fixed point instruction with an immediate constant.

Scope 11: Load and store offsets in load/store instructions, bits 16–31 from within each 32-bit load/store instruction.

These eleven scopes constitute a plausible subdivision of the PowerPC instruction and are provided by way of example, but not of limitation. Other specifications and refinements are possible and would not depart from the spirit and goals of the present invention. Empirical results available from measurements of a preferred embodiment of this invention show that this subdivision is effective.

Scope 1 covers the first register that is used as base register for load and store instructions. By convention, register R1 is mostly used for this purpose. By limiting the scope to this register, the relative frequency of using register R1 increases within this scope compared to its usage over the entire program. This helps conventional compression produce more compact encoding for register R1 within these instructions.

Scope 2 covers the remaining registers in a load/store instruction. By convention, there is a tendency to use registers R31 through R24, R0, and R3 through R8 for this purpose, more so than other registers. Again, this scope will reveal more frequent use of these registers, simplifying the job of a subsequent conventional compressor to come up with more compact encoding for this register field.

Scope 3 covers the registers used for fixed point arithmetic and logic instructions, while Scope 4 covers the those used for floating point arithmetic instructions. The empirical measurements from a preferred embodiment of this invention have shown that compilers tend to treat floating point registers in a different manner from fixed point registers.

Scope 5 covers all other registers that occur in instructions that are otherwise not covered by Scope 1 through Scope 4. Further refinement of that scope should be straightforward to someone skilled in the art, and depending upon empirical measurements drawn from a particular implementation of the invention described herein. Such a refinement conforms to the spirit and goals of this invention.

Scope 6 and Scope 7 respectively cover the branch offsets in absolute and relative addressing branch instructions. For absolute address branches, the encoded offsets are always drawn from the addresses of internal program functions, and therefore they tend to cluster around a few specific, although scattered, values. On the other hand, relative address offsets tend to range between the +/−1024 data range. Again, these separations make it easy for a conventional compressor to find the pattern of frequent use.

Scope 8 and Scope 9 do the same as Scopes 6 and 7, but with conditional instructions.

Scope 10 covers data literals that appear in arithmetic and logic instructions. Empirical measurements from a preferred embodiment of this invention showed that they tend to cluster around the range of values from −256 to +256 with large frequency.

Finally, Scope 11 covers data literals that appear as offsets in load/store instructions. These tend to cluster in the +/−64 value range with large frequency. Again, by treating these separately from the other literals, better compression becomes possible.

In addition to creating separate scopes for compressing registers, a compressor becomes even more effective when it imposes register usage conventions of its own. These conventions create associations between instructions and registers, creating more scopes, or obviating the need for an encoding of the register. The compiler could enforce these conventions, or a binary rewriting system could reallocate the registers for this purpose. For example, registers contain pointer addresses or data variables. A simple convention is to allocate pointer addresses from a certain range of registers and to allocate data variables from a different range. Note that a data variable could be allocated a register from the range of address registers if the range of data variable registers is exhausted, and vice versa. The purpose is not to enforce hard limits or strict usage conventions, but to increase the frequency of register usage for each category so as to increase the frequency of occurrences of particular registers within each category. The resulting code will be more amenable to compression than in the case of a compiler that allocates registers with no regard to compression needs.

Figure 2:
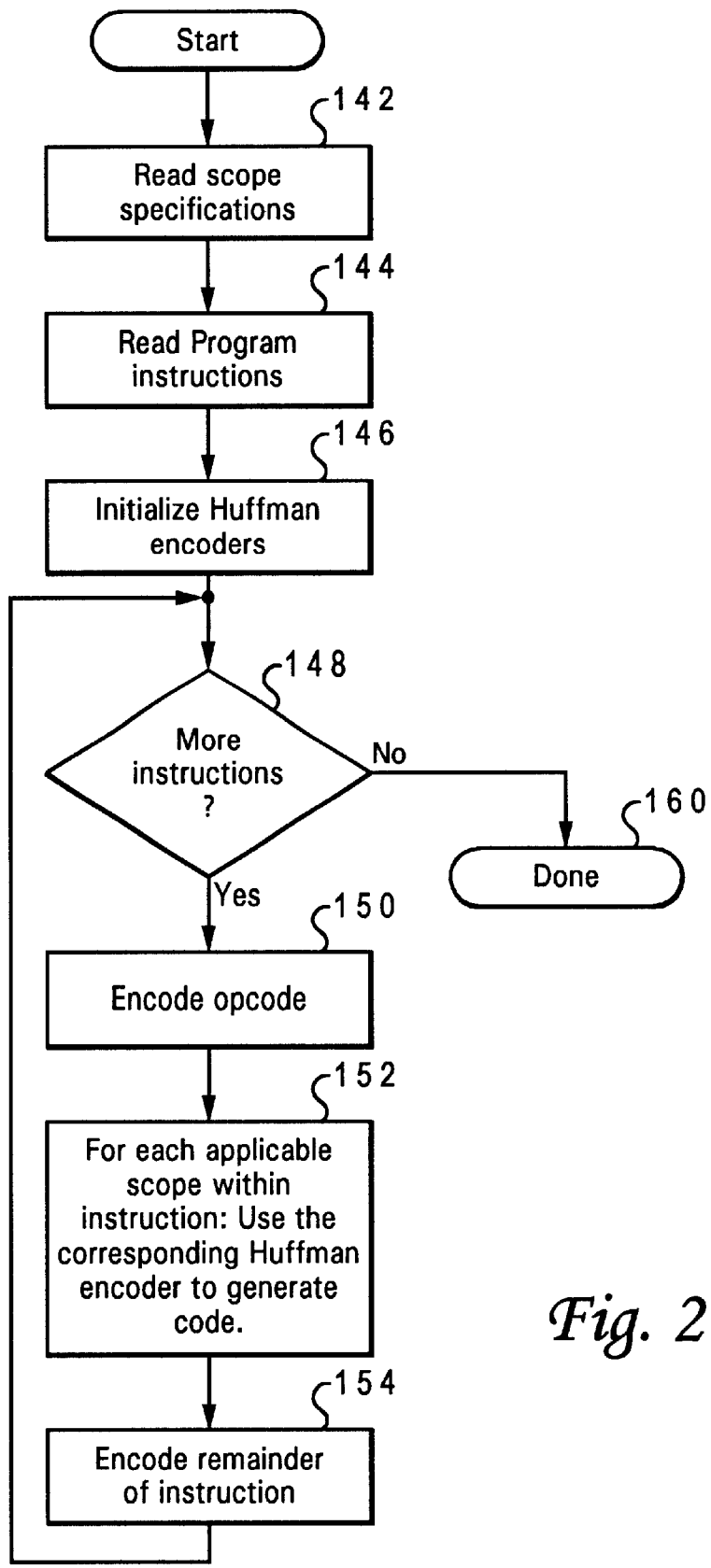
FIG. 2 is a high-level flowchart showing the steps for the compression algorithm in which a preferred embodiment of the present invention may be incorporated.

Referring now to FIG. 2, there is a high-level flowchart showing the steps for performing the compression technique by compressor depicted in FIG. 1 as described herein. The compressor receives as input a specification for subdividing the instruction set into scopes as described above (step 142), and an executable program to be compressed (step 144). Then, the compressor initializes a number of Huffman encoder. Such encoders could be implemented as established in the art. Additionally, other encoders could also be used, such as Ziv-Lempel. Huffman encoders, however, enable decompression to start anywhere in the middle of the code, unlike many other traditional methods. If this feature is not necessary, that is, the compressed program is to be decompressed entirely before running, then other traditional encoders could be used as well.

The number of Huffman encoders to use is equal to the number of scopes supplied in the specifications, and additionally, two more Huffman encoders are needed. The first is used to compress the opcodes of the instructions. These opcodes serve as anchors for the instructions and facilitate decompression, as would be appreciated by those skilled in the art. The second Huffman encoder is used to compress the remaining fields within instructions, that is, those fields that are not part of the opcode or those that are not falling under any scope specification.

Once input is initialized, as shown in FIG. 2, in step 148, the compressor starts a loop in which it compresses each instruction in the program in order. The loop consists of steps 150, 152 and 154, and continues until there are no more instructions to compress, in which case the compressor stops (step 160).

To compress each instruction, the compression first starts with compressing the opcode using the corresponding Huffman encoder (step 150). Then, for each register and literal (as applicable) that fall under a scope specification within the instruction, the corresponding Huffman encoder generates the appropriate compressed code in step 152. Finally the remainder of the instruction that has not been compressed thus far is compressed with the corresponding Huffman encoder in step 154.

By limiting the scope of values that each Huffman encoder has to work on, and by using the opcode as anchors to facilitate decompression, it should be appreciated that each Huffman encoder will find it easier to compress the stream of bits allocated to it. Additionally, the resulting size of the entire program is smaller than if it were to be compressed by a conventional compressor that treated the entire program stream as a string of opaque bits without exploiting the semantics of the instructions to its advantage.

It is also important to note that although the present invention has been described in the context of a hardware compressor, those skilled in the art will appreciate that the mechanisms of the present invention can be implemented in software and be distributed as a program product in a variety of forms, and that the present invention applies equally regardless of the particular type of signal bearing media utilized to actually carry out the distribution. Examples of signal bearing media include but are not limited to recordable type media such as floppy disks or CD ROMs, and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for code compression in a reduced instruction set computer (RISC) for executable code, said method comprising the steps of:

determining discernible patterns for instructions based on more register usage than register usage over an entire program and specifying register scopes within said instructions based on said determination;

determining discernible patterns for instructions based on more literal usage than literal usage over an entire program and subdividing specifying literal scopes within said instructions based on said determination; and applying conventional compression techniques to said register scopes and said literal scopes for producing more compact register encoding and more compact literal encoding.

2. The method for code compression in a reduced instruction set computer (RISC) for executable code according to claim 1, said method further comprises the step of:

performing a pre-processing phase where a binary of said program is rewritten such that some conventions for register usage are adhered to.

3. The method for code compression in a reduced instruction set computer (RISC) for executable code according to claim 1, wherein determining discernable patterns further comprises the step of:

exploiting semantics of said instructions and conventions compilers adopt in using said registers.

4. The method for code compression in a reduced instruction set computer (RISC) for executable code according to claim 1, wherein determining discernable patterns further comprises the step of:

determining a frequency of usage of certain literal ranges which are most pronounced within particular instructions.

5. The method for code compression in a reduced instruction set computer (RISC) for executable code according to claim 1, wherein determining discernable patterns further comprises the step of:

allocating pointer addresses from a predetermined range of registers and allocating data variables from a different range.

6. The method for code compression in a reduced instruction set computer (RISC) for executable code according to claim 1, wherein applying conventional compression techniques further comprises the step of:

applying Huffman encoding.

7. The method for code compression in a reduced instruction set computer (RISC) for executable code according to claim 1, wherein specifying said register scopes within said instructions further comprises the step of:

limiting said register scope to a base register when said instruction is for load/store operations.

8. The method for code compression in a reduced instruction set computer (RISC) for executable code according to claim 1, wherein specifying said literal scope within said instructions further comprises the step of:

limiting said literal scope to literals within said instructions when said instruction is for logic and arithmetic operations.

9. An information handling system, comprising:

means for determining discernible patterns for instructions based on more register usage than register usage over an entire program and means for specifying register scopes within said instruction based on said determination;

means for determining discernible patterns for instructions based on more literal usage than literal usage over an entire program and means for specifying literal scopes within said instructions based on said determination; and means for applying conventional compression techniques to said register scopes and said literal scopes for producing more compact register encoding and more compact literal encoding.

10. An information handling system according to claim 9, comprising:

means for performing a pre-processing phase where a binary of said program is rewritten such that some conventions for register usage are adhered to.

11. An information handling system according to claim 9, comprising:

means for exploiting semantics of said instructions and conventions compilers adopt in using said registers.

12. An information handling system according to claim 9, comprising:

means for determining a frequency of usage of certain literal ranges which are most pronounced in a particular instruction scope.

13. An information handling system according to claim 9, comprising:

means for allocating pointer addresses from a predetermined range of registers and allocating data variables from a different range.

14. An information handling system according to claim 9, comprising:

means for limiting said register scope to a base register when said instruction is for load/store operations.

15. An information handling system according to claim 9, comprising:

means for limiting said literal scope to literals within said instructions when said instructions are for logic and arithmetic operations.

16. An information handling system according to claim 9, comprising:

means for specifying a scope for a first register in load/store instructions, bits 11–15 from within each 32-bit load/store instruction.

17. An information handling system according to claim 9, comprising:

means for specifying second, and optionally third register scope in load/store instructions, bits 16–20 from within each 32-bit load/store instruction.

18. An information handling system according to claim 9, comprising:

means for specifying first, second and third register scopes, in fixed point arithmetic and logic instructions, bits 11–15, 16–20, and possibly 21–25 from within each 32-bit fixed point arithmetic and logic instruction.

19. An information handling system according to claim 9, comprising:

means for specifying first, second, and possibly third floating point register scopes in floating point arithmetic instructions, bit ranges 11–15, 16–20, and 21–25 from within each 32-bit floating point arithmetic instruction.

20. An information handling system according to claim 9, comprising:

means for specifying literal scope consisting of load/store offsets instructions, bit ranges 16–31 from within each 32-bit load/store instructions.

21. An information handling system according to claim 9, comprising:

means for specifying a literal scope consisting of branch offsets in one branch instruction with absolute targets, bits 6–29 from within the branch absolute instruction.

22. An information handling system according to claim 9, comprising:

means for specifying a literal scope consisting of branch offsets in one branch instruction with relative address target, bits 6–29 from within the branch relative instruction.

23. An information handling system according to claim 9, comprising:

means for specifying a literal scope consisting of branch offsets in conditional branch instructions with absolute targets, bits 16–29 from within each conditional branch 32-bit instruction with absolute addressing.

24. An information handling system according to claim 9, comprising:

means for specifying a literal scope consisting of branch offsets in conditional branch instructions with relative address targets, bits 16–29 from within each 32-bit conditional branch instruction with relative addressing.

25. An information handling system according to claim 9, comprising:

means for specifying a literal scope consisting of immediate constants in arithmetic and logic fixed point instructions, bits 16–31 from within each 32-bit arithmetic/logic fixed point instruction with an immediate constant.

26. An information handling system according to claim 9, comprising:

means for specifying a literal scope consisting of load and store offsets in load/store instructions, bits 16–31 from within each 32-bit load/store instruction.

27. A computer product residing on a computer usable medium for code compression in a reduced instruction set computer (RISC) within an information handling system, comprising:

instruction means for determining discernible patterns for instructions based on more register usage than register usage over an entire program and instruction means for specifying register scopes within said instructions based on said determination;

instruction means for determining discernible patterns for instructions based on more literal usage than literal usage over an entire program and instruction means for specifying literal scopes within said instructions based on said determination; and instruction means for applying conventional compression techniques to said register scopes and said literal scopes for producing more compact register encoding and more compact literal encoding.

* * * * *